(12) United States Patent
Chen

(10) Patent No.: US 6,247,379 B1
(45) Date of Patent: Jun. 19, 2001

(54) HAND BRAKE CONTROL MECHANISM

(75) Inventor: Scott Chen, Taoyuan Hsien (TW)

(73) Assignee: Eurocare Innovation Co., Ltd., Taoyuan Hsien (TW)

( * ) Notice: Subject to any disclaimer, the term of this patent is extended or adjusted under 35 U.S.C. 154(b) by 0 days.

(21) Appl. No.: 09/542,006

(22) Filed: Apr. 3, 2000

(51) Int. Cl.[7] ...................................................... F16C 1/12
(52) U.S. Cl. ............................................ 74/502.2; 74/489
(58) Field of Search ................................... 74/502.2, 502, 74/501.6, 489, 488

(56) References Cited

U.S. PATENT DOCUMENTS

| | | | |
|---|---|---|---|
| 5,845,539 | * 12/1998 | Huang | 74/502.2 X |
| 5,878,625 | * 3/1999 | Hu | 74/502.2 |
| 5,896,779 | * 4/1999 | Biesteker et al. | 74/502.2 |
| 5,953,962 | * 9/1999 | Hewson | 74/502.2 |

* cited by examiner

*Primary Examiner*—Mary Ann Green
(74) *Attorney, Agent, or Firm*—Bacon & Thomas, PLLC

(57) ABSTRACT

A hand brake control mechanism includes a hollow mounting base for coupling to the apparatus with which the hand brake control mechanism is to be used, an operation handle pivoted to the mounting base, an actuating bar pivoted to the mounting base and driven by the operation handle to pull a brake cable being connected thereto, and a link pivoted to the mounting base and acted with the operation handle, wherein the operation handle is turned relative to the mounting base between at least three different positions, and the link controls the relative action between the operation handle and the actuating bar, enabling the brake cable to be controlled by the operation handle to achieve a temporary braking function or a continuous braking function, or to be released from braking operation when the operation handle is not in the state of the aforesaid temporary braking or continuous braking function.

7 Claims, 5 Drawing Sheets

HAND BRAKE CONTROL MECHANISM

BACKGROUND OF THE INVENTION

The present invention relates to a hand brake control mechanism, and more particularly to such a hand brake control mechanism designed for use with a wheeled apparatus, for example, a walker, and operated to stop the wheels of the walker.

Various folding collapsible and non-collapsible walkers have been disclosed for use to support the user when walking. Exemplars are seen in U.S. Pat. Nos. 4,907,794 and 5,020,560. Because regular walkers for this purpose are commonly equipped with wheels, hand brake means is necessary. Conventional hand brakes for walkers cannot be maintained in the braking position when released from the hand. U.S. Pat. No. 5,279,180 (equivalent to Taiwan Pat. No. 199339) discloses a hand brake for walker that can be moved to a temporary braking position, or a continuous braking position. When the operation handle of the hand brake is turned downwards to the continuous braking position, the operation handle is retained engaged with a mounting base, and the brake cable is maintained stretched. This structure of hand brake is still not satisfactory in function. The drawbacks of this structure of hand brake are as follows:

1. Frequently moving the operation handle over the engagement area at the mounting base causes the contact area to wear, and the operation handle becomes unable to be firmly retained in the continuous braking position when the contact area begins to wear.

2. Because the engagement force between the operation handle and the mounting base must surpass the return force of the brake cable, much effort should be applied to the operation handle when turning the operation handle to the continuous braking position.

SUMMARY OF THE INVENTION

It is the main object of the present invention to provide a hand brake control mechanism, which is practical and durable in use. A hand brake control mechanism according to the present invention is designed for use in a wheeled apparatus for controlling the operation of a brake cable. The hand brake control mechanism is comprised of a mounting base, an operation handle, an actuating bar, and a link. The mounting base comprises a coupling portion coupled to a part of the wheeled apparatus, an open chamber, and a stop block disposed inside the open chamber. The stop block has a smoothly arched recess. The operation handle is pivoted to the mounting base, comprising a front end inserted into the open chamber of the mounting base, a front end edge at the front end, and two parallel lugs forwardly extended from the front end. The parallel lugs each comprise an elongated sliding slot, and a front notch. The actuating bar is turned about a pivot, which is mounted in the open chamber and inserted through the sliding slots on the lugs of the operation handle, having one end connected to the brake cable in the wheeled apparatus. The link has a first end pivoted to the stop block inside the mounting base, a second end, and two projecting rods bilaterally extended from the second end for engaging into the front notches on the lugs of the operation handle. The operation handle is turned relative to the mounting base between a first position, a second position, and a third position. When the operation handle is turned to the second position, the hand brake control mechanism does no work, and the brake cable is released. When the operation handle is turned upwards from the second position to the first position, the actuating bar is forced forwards by the front end edge of the operation handle, and the brake cable is pulled up. When the user releases the operation handle, the operation handle is moved with the brake cable from the first position to the second position. When the operation handle is pushed downwards from the second position to the third position, the link is moved with the front notches of the lugs of the operation handle and stopped at a part of the actuating bar. At this stage, the brake cable is pulled up, and the operation handle is held in position. Preferably, the sliding slots on the lugs of the operation handle have a substantially (-shaped profile. Further, the actuating bar has a stop portion for engagement with the link when the operation handle is moved to the third position. When the operation handle is moved to the third position, the link and the actuating bar define a 90° contained angle. The stop portion of the actuating bar preferably has a <-shaped profile.

DETAILED DESCRIPTION OF THE PREFERRED EMBODIMENT

Figure 1:
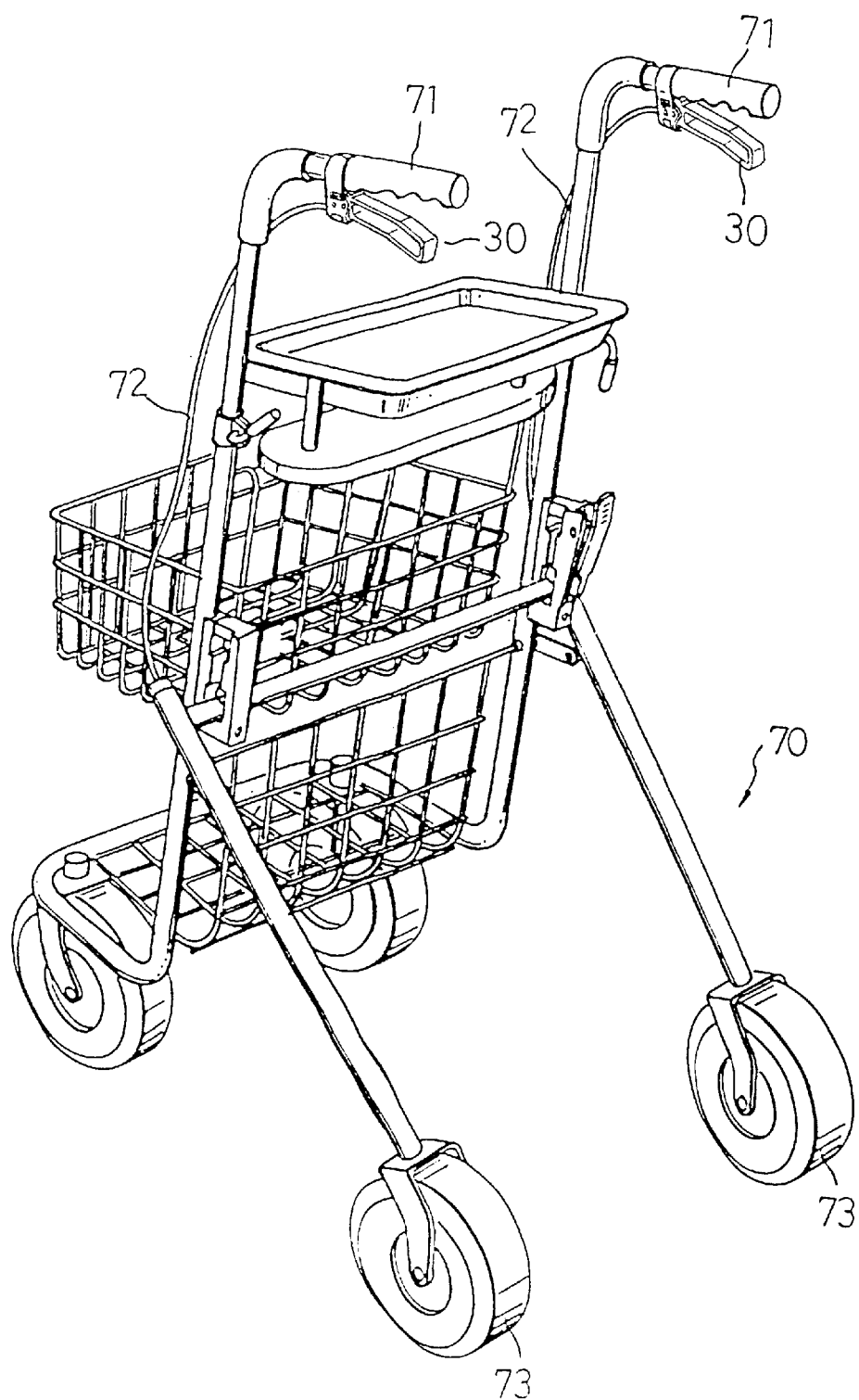
FIG. 1 illustrates two hand brake control mechanisms installed in a walker according to the present invention.

FIG. 1 shows the present invention used in a walker 70, in which two hand brake control mechanisms 10 (see also FIG. 2) are respectively installed in the handlebars 71 of the walker 70 for operation by hand to pull a respective brake cable 72 in stopping a respective wheel 73 of the walker 70.

Figure 2:
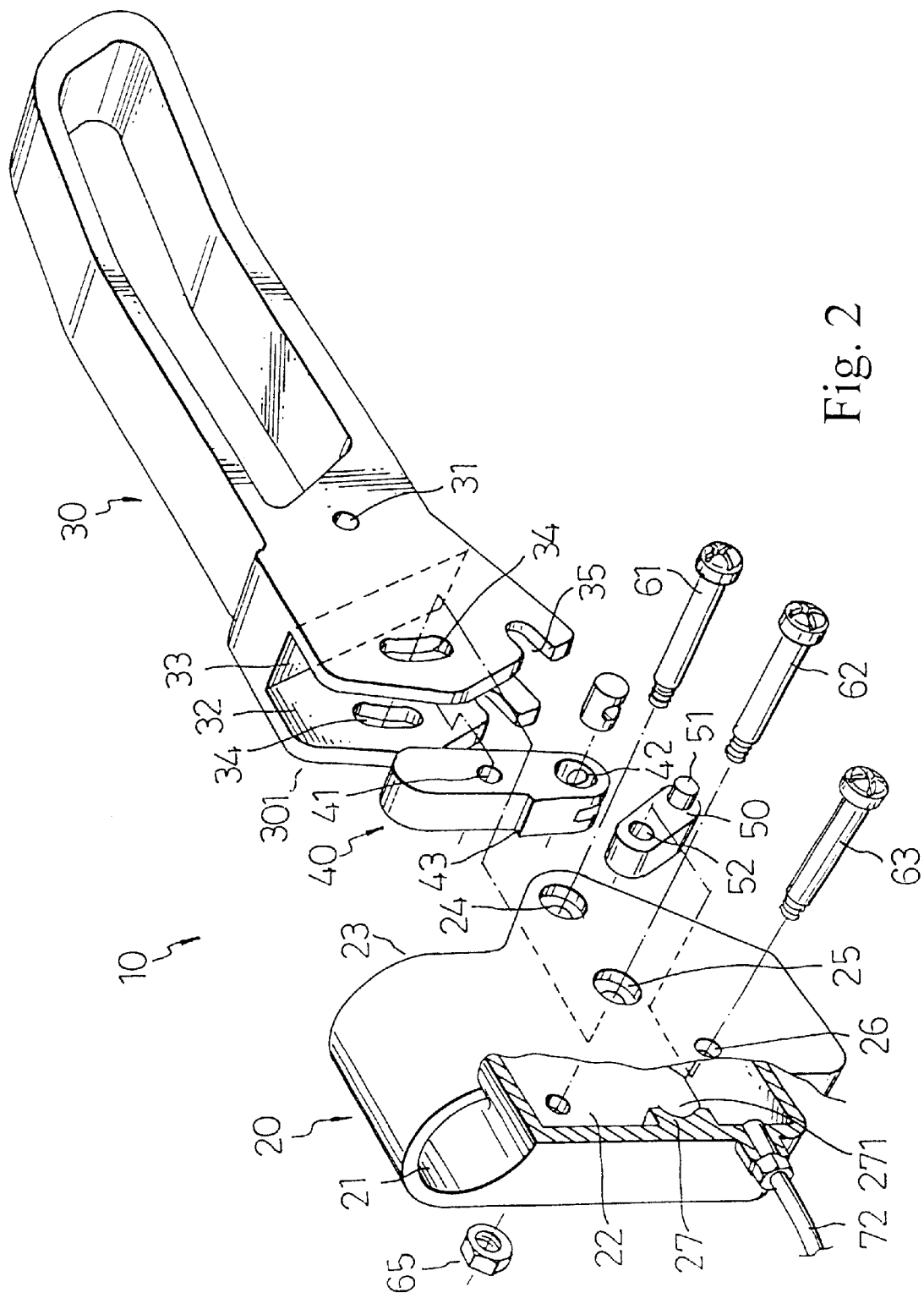
FIG. 2 is an exploded view of a hand brake control mechanism according to the present invention.

Referring to FIG. 2, a hand brake control mechanism 10 is generally comprised of a hollow mounting base 20, and operation handle 30, an actuating bar 40, and a link 50. The hollow mounting base 20 comprises a coupling portion 21, a chamber 22, three pairs of through holes, namely, the first through holes 24, the second through holes 25 and the third through holes 26 disposed through two opposite sidewalls of the chamber 22, and a stop block 27 inside the open chamber 22. The coupling portion 21 enables the mounting base 20 to be coupled to a part, for example, one handle bar 71 of the walker 70. The chamber 22 has an opening 23 at one side. Through the opening 23, the front end 301, the actuating bar 40 and the link 50 are inserted into the chamber 22. The stop block 27 is disposed at an inner side of the chamber 22 remote from the opening 23, having a smoothly arched recess 271. The third through holes 26 are aligned at two opposite sides of the smoothly arched recess 271 of the stop block 27. The operation handle 30 is provided for the user to operate the hand brake control mechanism 10. As illustrated, the operation handle 30 comprises a front end edge 33, two parallel lugs 32 disposed at the front end 301, and a transverse pivot hole 31 disposed near the front end edge 33 and pivotally connected between the first through holes 24 on the mounting base 20 by a pivot bolt 61 and a nut (not shown). The parallel lugs 32 each comprise an elongated, arched, vertically extended sliding slot 34, and a front notch 35. The actuating bar 40 comprises a pivot hole 41, a brake cable mounting portion 42, and a stop portion 43.

A pivot bolt 62 is inserted through the second through holes 25 on the mounting base 20 and the sliding slots 34 on the lugs 32 of the operation handle 30 and the pivot hole 41 on the actuating bar 40 and screwed up with a nut 65 to secure the actuating bar 49 between the lugs 32 of the operation handle 30 inside the chamber 22. The stop portion 43 is formed on a front sidewall of the actuating bar 40 at a lower elevation, having a substantially <-shaped profile. The brake cable mounting portion 42 is connected to one end of one brake cable 72, which has its opposite end connected to the brake shoe (not shown) at one side of one wheel 73 of the walker 70 (see also FIG. 1). The link 50 comprises a pivot hole 52 transversely disposed near the smoothly chamfered front end thereof and pivotally connected between the third through holes 26 on the mounting base 20 by a pivot bolt 63 and a nut (not shown), and two projecting rods 51 aligned at two opposite sides of the smoothly chamfered rear end thereof corresponding to the front notches 35 on the lugs 32 of the operation handle 30. The smoothly arched recess 271 of the stop block 27 receives the smoothly chamfered front end of the link 50, enabling the link 50 to be turned about the pivot bolt 63 within a limited angle. When the link 50 is turned about the pivot bolt 63, the smoothly chamfered rear end of the link 51 is moved relative to the stop portion 43 of the actuating bar 40.

Figure 3:
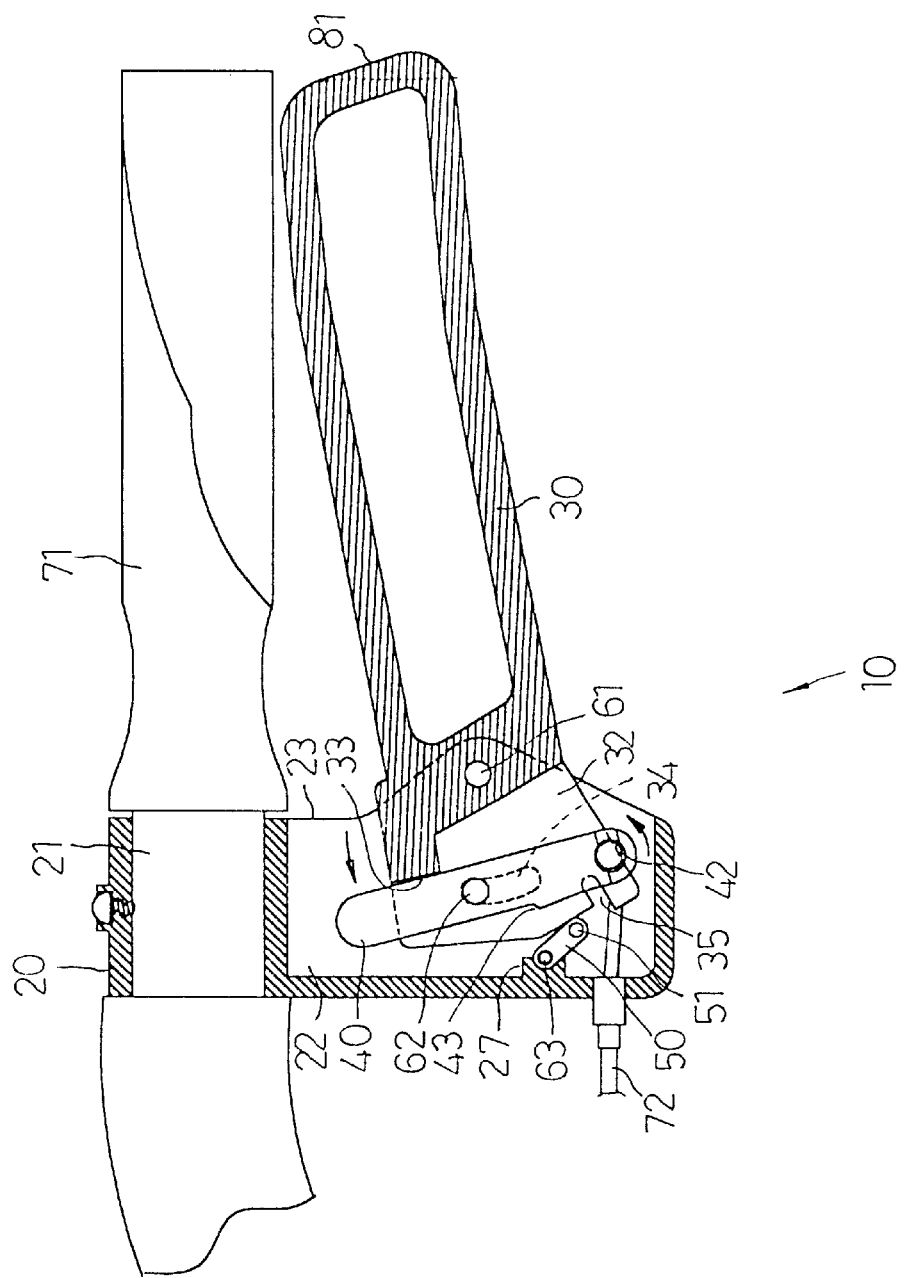
FIG. 3 is a sectional view of the hand brake control mechanism, showing the operation handle moved to the first position.
Figure 4:
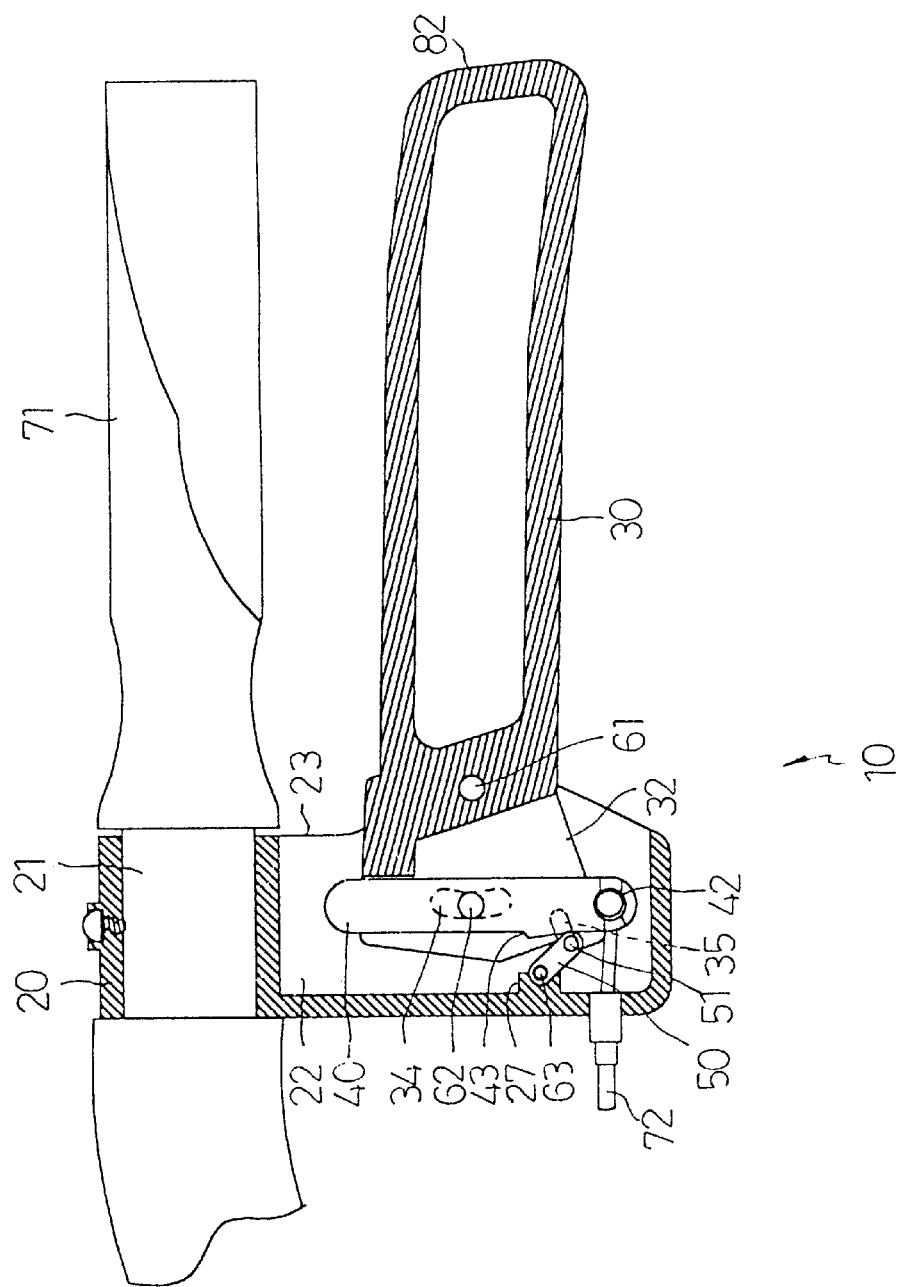
FIG. 4 is similar to FIG. 3 but showing the operation handle moved to the second position.
Figure 5:
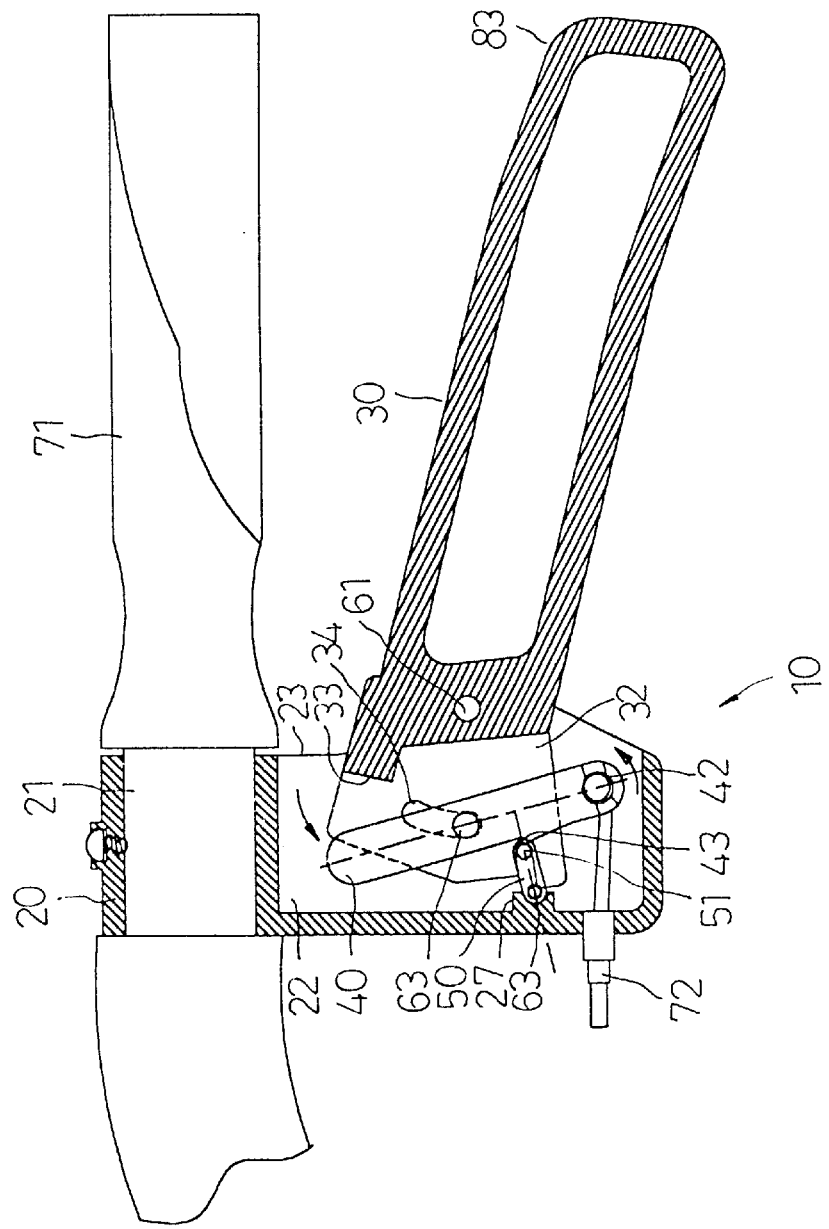
FIG. 5 is similar to FIG. 3 but showing the operation handle moved to the third position.

The operation of the present invention is outlined hereinafter with reference to FIGS. from 3 through 5. In FIG. 4, the hand brake control mechanism 10 does no work, the operation handle 30 is disposed in the second position 82, and the brake cable 72 is released. In FIG. 3, the operation handle 30 is pulled upwards to the first position 81, the actuating bar 40 is forced forwards by the front end edge 33 of the operation handle 30, and the brake cable 72 is moved with the brake cable mounting portion 42 to pull up the brake shoe (not shown). When the user releases the operation handle 30, the operation handle 30 is moved with the brake cable 72 from the first position 81 to the previous second position 82. In FIG. 5, the operation handle 30 is pushed downwards from the second position 82 to the third position 83, the link 50 is moved with the front notches 35 on the lugs 32 of the operation handle 30 and turned about the pivot bolt 63 to the maximum tilting angle position and stopped at the stop portion 43 at the actuating bar 40. At this stage, the link 50 and the actuating bar 40 define a contained angle about 90°. Because the actuating bar 40 is turned backwards by the link 50 when the operation handle 30 is moved to the third position 83, the brake cable 72 is driven to pull up the brake shoe in stopping the wheel. When the user releases the operation handle 30 after the operation handle 30 has been moved to the third position 83, the operation handle 30 is still maintained in the third position 83. The continuous braking status is released only when the operation handle 30 is turned upwards from the third position 83 to the second position 82 or first position 81.

While only one embodiment of the present invention has been shown and described, it will be understood that various modifications and changes could be made thereunto without departing from the spirit and scope of the invention disclosed.

What the invention claimed is:

1. A hand brake control mechanism installed in a wheeled apparatus for controlling the operation of a brake cable of the wheeled apparatus, comprising:

a mounting base, said mounting base comprising a coupling portion coupled to a part of the wheeled apparatus, an open chamber, and a stop block disposed inside said open chamber;

an operation handle pivoted to said mounting base, said operation handle comprising a front end inserted into said open chamber, a front end edge at the front end, and two parallel lugs forwardly extended from the front end, said parallel lugs each comprising an elongated sliding slot, and a front notch;

a pivot inserted and mounted in the open chamber in said mounting base and inserted through the sliding slots on said lugs of said operation handle;

an actuating bar turned about said pivot in said open chamber between the lugs of said operation handle, said actuating bar having a brake cable mounting portion disposed at one end and connected to the brake cable in the wheeled apparatus; and a link, said link having a first end pivoted to said stop block inside said mounting base, a second end, and two projecting rods bilaterally extended from said second end for engaging into the front notches on the lugs of said operation handle;

wherein said operation handle can be moved relative to said mounting base between a first position, a second position, and a third position; said operation handle is disposed in said second position and the brake cable does no work when said operation handle receives no applied force; when an applied force is given to said operation handle to move said operation handle to said first position, said actuating bar is moved by said operation handle to pull up the brake cable, and the brake cable is released upon disappearance of the applied force from said operation handle; when said operation handle is moved by an applied force to said third position, the projecting rods of said link are forced upwards by the front notches of the lugs of said operation handle, causing the brake cable mounting portion of said actuating bar to hold the brake cable in a continuously braking status, and keeping the brake cable to be maintained in the braking status after disappearance of the applied force from said operation handle.

2. The hand brake control mechanism of claim 1 wherein the elongated sliding slot on each lug of said operation handle has a (-shaped profile.

3. The hand brake control mechanism of claim 1 wherein the first end of said link is smoothly arched, and said stop block has a recessed portion receiving the smoothly arched first end of said link.

4. The hand brake control mechanism of claim 3 wherein the recessed portion of said stop block is smoothly arched.

5. The hand brake control mechanism of claim 1 wherein said actuating bar comprises a stop portion at a front side thereof adjacent to said mounting base.

6. The hand brake control mechanism of claim 5 wherein said stop portion of said actuating bar has a <-shaped profile.

7. The hand brake control mechanism of claim 1 wherein said actuating bar and said link define a 90° contained angle when said operation handle is moved to said third position.

* * * * *